US005908567A

United States Patent [19]

Sakuragi et al.

[11] Patent Number: 5,908,567

[45] Date of Patent: Jun. 1, 1999

[54] ELECTRODE FOR PLASMA ARC TORCH

[75] Inventors: Shunichi Sakuragi; Naoya Tsurumaki, both of Kanagawa-ken, Japan

[73] Assignee: Komatsu Ltd., Japan

[21] Appl. No.: 08/945,222

[22] PCT Filed: Apr. 18, 1996

[86] PCT No.: PCT/JP96/01058

§ 371 Date: Oct. 17, 1997

§ 102(e) Date: Oct. 17, 1997

[87] PCT Pub. No.: WO96/33597

PCT Pub. Date: Oct. 24, 1996

[30] Foreign Application Priority Data

Apr. 19, 1995 [JP] Japan .................................... 7-093471

[51] Int. Cl.[6] ..................................................... B23K 10/00

[52] U.S. Cl. ........................ 219/121.52; 219/119; 219/75

[58] Field of Search ......................... 219/121.52, 121.56, 219/74, 75, 118, 119, 121.37, 121.39

[56] References Cited

U.S. PATENT DOCUMENTS

| | | | |
|---|---|---|---|
| 3,930,139 | 12/1975 | Bykhovsky et al. ............... | 219/121.52 |
| 5,097,111 | 3/1992 | Severance, Jr. .................... | 219/121.48 |
| 5,200,594 | 4/1993 | Okada et al. ...................... | 219/121.52 |
| 5,330,097 | 7/1994 | Inoue . | |
| 5,451,739 | 9/1995 | Nemchinsky et al. ............. | 219/121.52 |
| 5,676,864 | 10/1997 | Walters ............................. | 219/121.52 |

FOREIGN PATENT DOCUMENTS

| | | |
|---|---|---|
| 0465109 | 1/1992 | European Pat. Off. . |
| 01012559 | 1/1989 | Japan . |
| 02092875 | 4/1990 | Japan . |
| 03005073 | 1/1991 | Japan . |
| 3-225727 | 10/1991 | Japan . |
| 5-70250 | 10/1993 | Japan . |

*Primary Examiner*—Mark Paschall
*Attorney, Agent, or Firm*—Fish & Richardson P.C.

[57] ABSTRACT

In an electrode for a plasma arc torch, an electrode member (1) composed of either one of homologous elements of hafnium, zirconium or titanium, or a mixed material of these elements is embedded into a front end portion of an electrode body (1a) and brazed and joined thereto by a brazing material, the electrode is characterized in that the electrode member and the electrode body are brazed by a brazing material (14a) including no copper component.

7 Claims, 5 Drawing Sheets

ELECTRODE FOR PLASMA ARC TORCH

TECHNICAL FIELD

The present invention relates to an electrode for a plasma arc torch.

BACKGROUND ART

A plasma arc torch is generally utilized for metal workings including cutting, welding, surface treating, dissolving and annealing Workings. As such plasma arc torch, one for the metal cutting working generally has a structure, for example, shown in FIG. 1.

In FIG. 1, reference numeral 13 denotes a torch body, reference numeral 1*a* is an electrode holder supported by the torch body 13, and reference numeral 1 is an electrode member embedded in and and joined to the electrode holder 1*a*. Reference numeral 2 is a nozzle supported by the torch body 13 through a nozzle supporting member 3 so as to surround the electrode member 1 and be positioned on a front end side of the electrode member 1, reference numeral 4 is a nozzle cap supported by the torch body 13, surrounding the nozzle 2 except the front end portion thereof and having a front end secured to the front end portion of the nozzle 2, and reference numeral 5 is a nozzle protecting cap supported by the torch body 13 and surrounding the outer side of the nozzle cap 4.

A plasma gas passage 6 is formed to a peripheral portion of the electrode member 1 so as to communicate with the nozzle 2 from this peripheral portion, and a cooling water passage 7 is further formed between the nozzle 2 and the nozzle cap 4. Still furthermore, a secondary gas passage 8 is formed between the nozzle cap 4 and the nozzle protecting cap 5 so as to open to the front end side of the nozzle 2.

The nozzle protecting cap 5 is in an electrically insulated from the nozzle cap 4.

The electrode body 1*a* is formed with a cooling water chamber 9 for cooling the electrode member 1, and the cooling water chamber 9 communicates with the cooling water passage 7. The cooling water chamber 9 is connected to a cooling water flow-in passage 10 and the cooling water passage 7 is connected to a cooling water flow-out passage 10*a*. On the other hand, a plasma gas flow-in passage 11 is connected to the plasma gas passage 6 and a secondary gas flow-in passage 12 is also connected to the secondary gas passage 8.

The torch body 13 serves to support the respective members and portions mentioned above and is electrically insulated from the electrode member 1 and the nozzle 2, and the nozzle protecting cap 5 is screw engaged with the torch body 13.

The electrode member 1 used for such plasma arc torch is formed of, in consideration of durability under a high temperature condition, a heat resistant material of homologous element such as hafnium (Hf), zirconium (Zr), titanium (Ti), etc., and the electrode member 1 is joined to the electrode body 1*a* formed of copper (Cu) by means of brazing.

The joining of the electrode member 1 to the electrode body 1*a* will be performed, by a method other than the brazing, as disclosed in the Japanese Patent Publication No. HEI 5-70250 teaching a technique that a sleeve made of such as silver is inserted into the electrode body 1*a* and the electrode member 1 is then inserted into the sleeve and fixed thereto. In this structure, however, surfaces to be joined of both the electrode member 1 and electrode body 1*a* have irregularity, which will constitute heat conduction resistance, thus being inconvenient.

In order to obviate this defect, when the electrode member 1 and the electrode body 1*a* are joined by means of brazing, the irregular surfaces are embedded with a brazing material, providing an excellent heat conduction performance therebetween and providing an improved cooling effect even if the electrode member 1 is formed of hafnium having a bad heat conduction property.

According to such fact, as mentioned above, the electrode member 1 is joined to the electrode body 1*a* by means of brazing and a silver (Ag) material is used as a brazing material including copper (Cu) of from several % to several tens % to lower a melting point thereof.

FIG. 2 shows a condition of a joined portion in a case where the hafnium electrode body 1 is the copper electrode body 1*a* by using a brazing material 14 formed of a silver material including copper of 30% (Ag+30%Cu), and a mixed crystal layer 15 formed of Hf as a material of the electrode member and Cu contained in the brazing material 14 (Hf-Cu mixed crystal layer) is formed to a boundary surface between the electrode member 1 and the brazing material 14.

The Hf-Cu mixed crystal layer 15 is formed of an extremely hard material having a large brittleness. For example, in the measurement of the inventors, such Hf-Cu mixed crystal layer 15 has a Vickers hardness of about 500–600, and on the other hand, the Hf electrode member 1 and the Ag brazing member 14 have Vickers hardness of about 200 and 100, respectively.

In a case where an arc generation/extinction is repeated by using the electrode member 1 in such joined condition, a crack 16 is caused at the front end portion of the contact boundary between the Hf of the electrode member 1 and the Hf-Cu mixed crystal layer.

As a main reason of such generation of crack, thermal stress due to rapid temperature increasing at the arc generation time will be considered. When such crack 16 is caused at the joined surface of the electrode member 1, this portion exhibits a lower cooling effect, and consumption of the electrode material at this portion will rapidly progress, which results in an extremely lowered durability as the electrode member for the plasma arc torch.

Further, although the above example is one using hafnium for the electrode member 1, it has been confirmed that, in a case where the electrode member 1 is formed of zirconium or titanium and joined by means of brazing member containing copper, a mixed crystal layer composed of the respective materials of the electrode member and the brazing member has been also formed to a boundary surface therebetween. Such mixed crystal layer has a large hardness and large brittleness as like in the Hf-Cu mixed crystal layer 15 as mentioned above.

The present invention was conceived in view of the above fact, and in consideration of the above problems, the basic reason therefor resides in that the copper mixed crystal layer having a large brittleness is formed to the portion contacting the electrode member, and accordingly, the present invention aims to provide an electrode for a plasma arc torch capable of extremely improving durability with no generation of crack to a peripheral portion of an electrode member even by repeatedly performing an arc generation/extinction process under a condition that no copper mixed crystal layer constituting a brittleness layer is formed between the electrode member and a brazing material.

DISCLOSURE OF THE INVENTION

To achieve the above object, according to the present invention, there is provided an electrode for a plasma arc torch in which an electrode member composed of either one of homologous elements of hafnium, zirconium or titanium, or a mixed material of these elements is embedded into a front end portion of an electrode body and brazed and joined thereto by a brazing material, the electrode being characterized in that the electrode member and the electrode body are brazed by a brazing material includingno copper component.

In this embodiment, it is preferred that the front end portion of the electrode body to which the electrode member is joined is composed of a material including no copper component such as silver or silver alloy.

Furthermore, in this embodiment, it is preferred that an isolation member formed of a material having a high melting point and including no copper component such as nickel is joined to an electrode body including copper through the brazing material and the electrode body including copper and the electrode member are joined through the isolation member which is joined to the electrode member through the brazing material.

According to the above structures, when the electrode member is embedded into the electrode body and joined by means of brazing, any copper mixed crystal layer is not formed to the joining surface of the electrode member.

Accordingly, since the brittle layer which is the mixed crystal layer is not formed to the joining surface of the electrode member, no crack occurs at a peripheral portion of the electrode member even through repeated arc generation/extinction process and the durability of the electrode can be remarkably improved.

BRIEF DESCRIPTION OF THE DRAWINGS

The present invention will be made more understandable through the following detailed explanation and accompanying drawings representing preferred embodiments of the present invention. Further, it is to be noted that the embodiments shown in the drawings do not intend to specify the invention and are ones mere for easy explanation and understanding thereof.

In the accompanying drawings.

BEST MODES FOR EMBODYING THE INVENTION

Embodiments of electrodes for plasma arc torches according to the present invention will be described hereunder with reference to FIGS. 3 to 6.

Figure 3A:
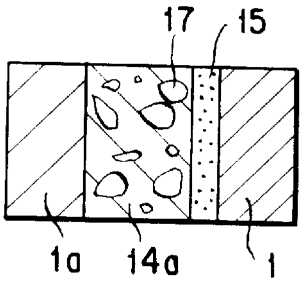
FIGS. 3A and 3B are schematic views showing conditions of joined portions of electrodes of plasma arc torches, respectively, according to embodiments of the present invention.

FIG. 3A shows a joined condition of a joined portion in which an electrode member 1 made of hafnium was brazed to an electrode body 1*a* made of copper under a vacuum atmosphere by using a brazing material 14*a* of (Ag+3.9% Li). In this case, although the brazing material 14*a* did not include a copper component, a part of copper contained in the electrode body 1*a* was melted on the way of the joining process and fused into the brazing material 14*a*. The fused copper component 17 floated in the melted brazing material 14*a* and reached the surface of the electrode member 1 to thereby form a thin Hf-Cu mixed crystal layer 15 to the surface of the electrode member 1.

Figure 3B:
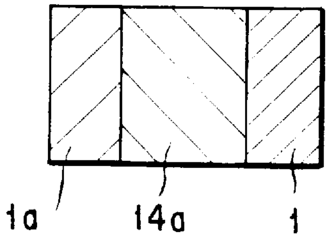

Further, as like in the above case, FIG. 3B shows a joined condition of a joined portion in which an electrode member 1 made of hafnium was brazed to an electrode body 1*a* made of silver under a vacuum atmosphere by using a brazing material 14*a* of (Ag+3.9% Li). In this case, since copper component did not exist at any portion, the Hf-Cu mixed crystal layer was not formed at all.

Figure 1:
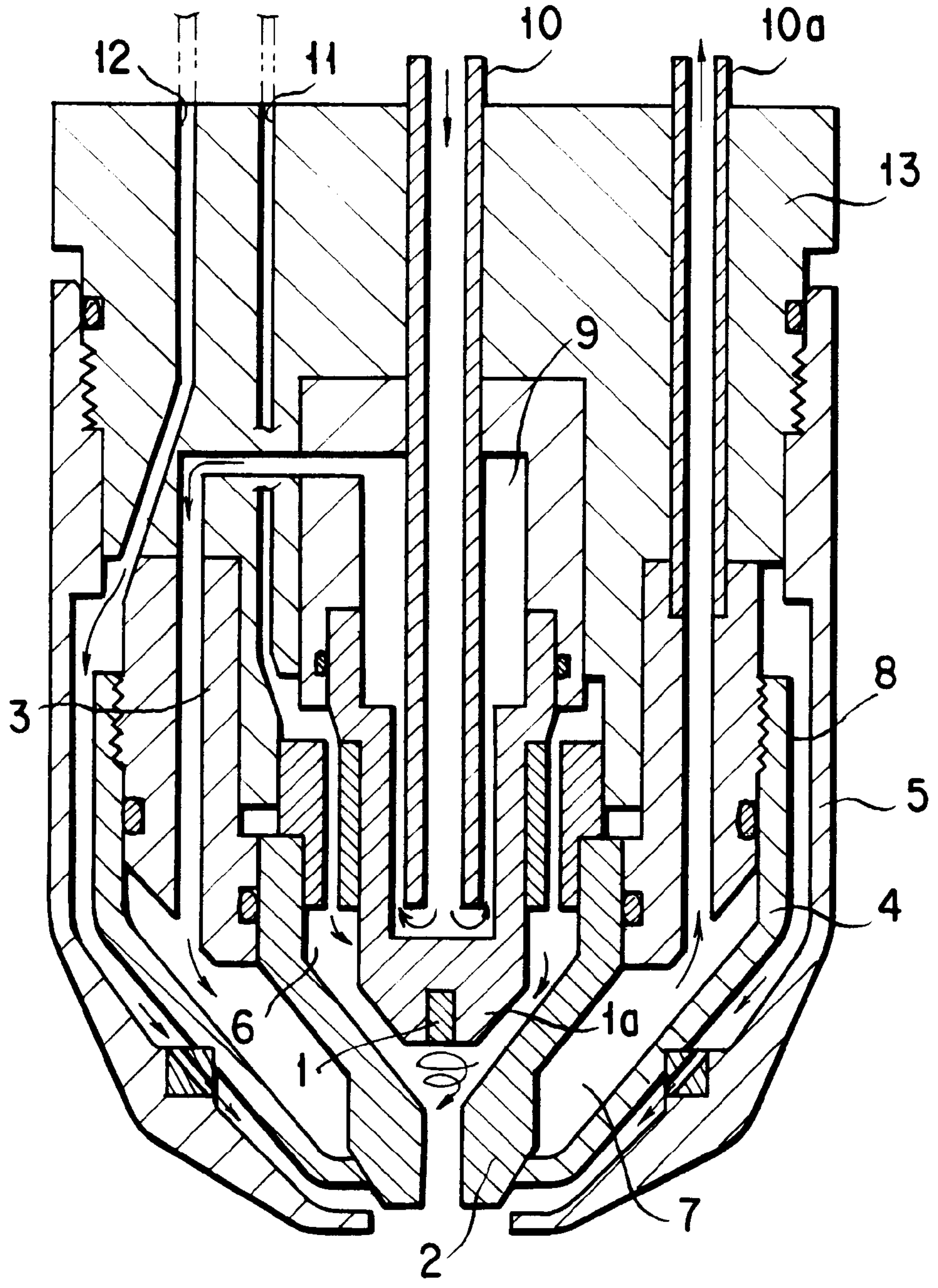
FIG. 1 is a sectional view showing one example of an important portion of a plasma arc torch for cutting working.
Figure 2:
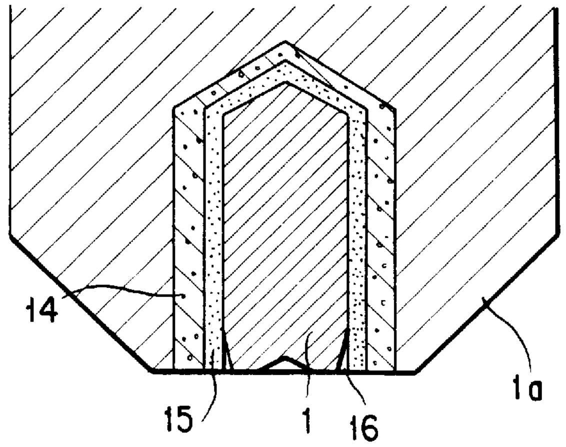
FIG. 2 is a schematic sectional view showing an important portion of an electrode for a plasma arc torch of a conventional structure.

Durability tests were performed by using both the electrodes (joined electrodes) shown in FIGS. 3A and 3B, and according to the test results, although the embodiment shown in FIG. 3A provided a sufficiently improved durability with respect to the conventional example shown in FIG. 2, the embodiment shown in FIG. 3B provided a more sufficiently improved result.

Figure 4A:
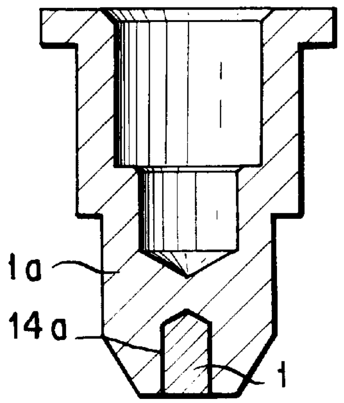
FIGS. 4A, 4B and 4C are sectional views showing electrode structures, respectively, according to embodiments of the present invention.
Figure 4B:
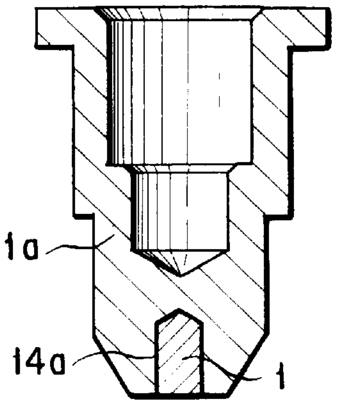
Figure 4C:
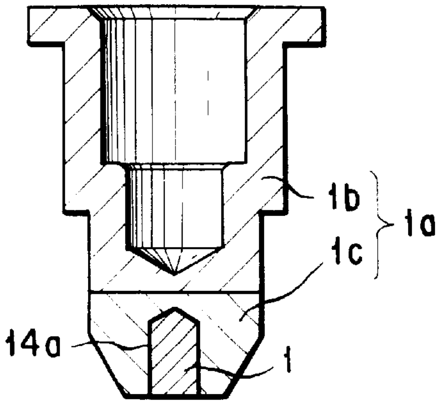

FIGS. 4A, 4B and 4C represent embodiments which use different materials for the electrode body 1*a*.

The embodiment of FIG. 4A uses an electrode body 1*a* formed of copper as like in the conventional example, the embodiment of FIG. 4B uses an electrode body 1*a* entirely formed of silver, and the embodiment of FIG. 4C uses an electrode body 1*a* having a base portion 1*b* formed of copper and a front end portion 1*c*, formed of silver, to be joined to the base portion 1*b*. The electrode members 1 formed of hafnium were brazed to join them to these electrode bodies 1*a* by using the brazing material 14*a* (Ag+3.9% Li).

Further, in the embodiment of FIG. 4C, the base portion 1*b* of the electrode body 1*a* and the front end portion 1*c* thereof was joined through a thermal diffusion joining process in a vacuum heating furnace with a temperature of about 800° C. The brazing joining between the electrode bodies 1*a* and the electrode members 1 were performed under the vacuum atmosphere with a temperature of about 760° C.

Figure 5:
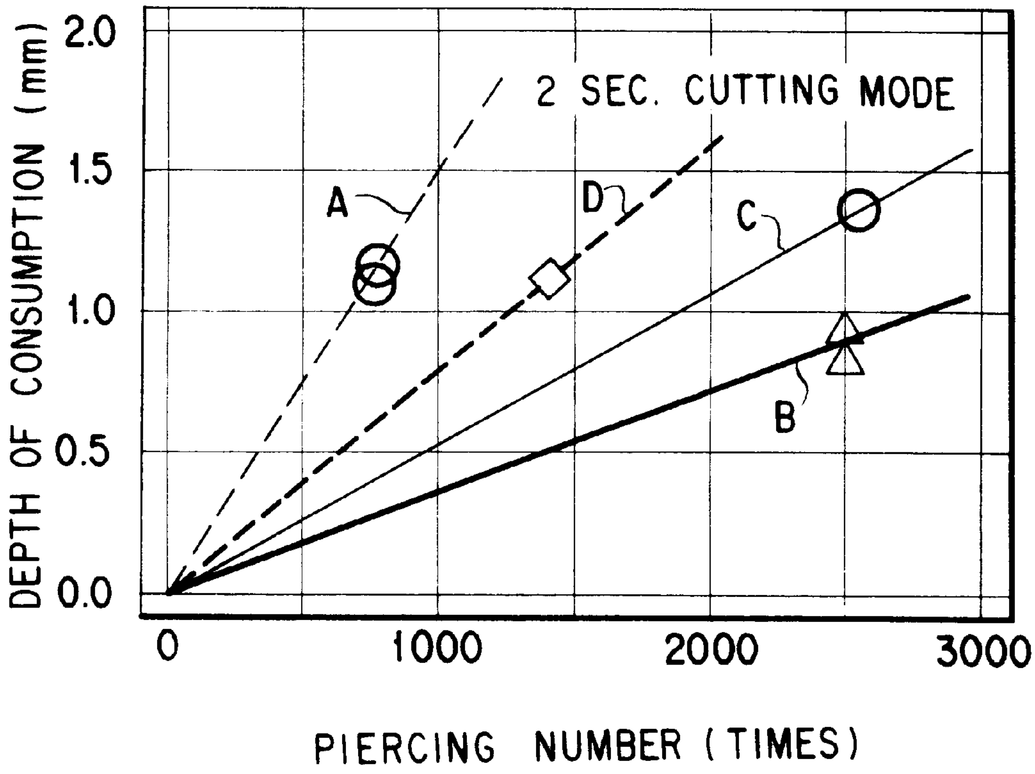
FIG. 5 is a graph representing a relation of a consumption depth with respect to a piercing number.

With the embodiments represented by FIGS. 4A, 4B and 4C, the durability tests for investigating the depth of consumption of the respective electrode members 1 with respect to the pierce numbers were performed and the test results are shown in FIG. 5. The durability tests are carried out by repeating a pattern in which carbon steel plate having a thickness of 1.6 mm was cut for 2 seconds at an arc current of 27 A(amperes).

Referring to FIG. 5, the capital A represents a case of the structure shown in FIG. 4A, and in this case, the depth of consumption reached 1.1–1.2 mm through cutting frequency of about 700–800 times. The capital B in FIG. 5 represents a case using the silver solid electrode body 1*a* shown in FIG. 4B, and in this case, the depth of consumption reached 0.8–0.9 mm through cutting frequency of 2500 times. The capital C in FIG. 5 represents a case of the embodiment of FIG. 4C and in this case, the depth of consumption reached 1.4 mm through cutting frequency of 2500 times.

The reason why the test results with respect to the embodiments of FIGS. 4B and 4C, in which the depths of consumption were 0.8–0.9 mm and 1.4 mm in the same cutting frequency of 2500 times, differed from each other seems that, in the embodiment of FIG. 4C in which the base portion 1*b* and the front end portion 1*c* are joined, resistance of heat conduction was caused at this joined portion, leading to the difference in cooling effects in both the portions.

The capital D in FIG. 5 represents the test result of a case of the embodiment of FIG. 3A in which the electrode member 1 is joined to the copper electrode body 1*a* by the brazing material 14*a* including no copper component, and in this case, depth of consumption reached 1.1 mm through cutting frequency of about 1400 times. According to this embodiment, the life time could be improved in comparison with the conventional structure.

As can be seen from the above test results, the effect of removing the Hf-Cu mixed crystal layer from the brazed and joined surface was confirmed.

Figure 6A:
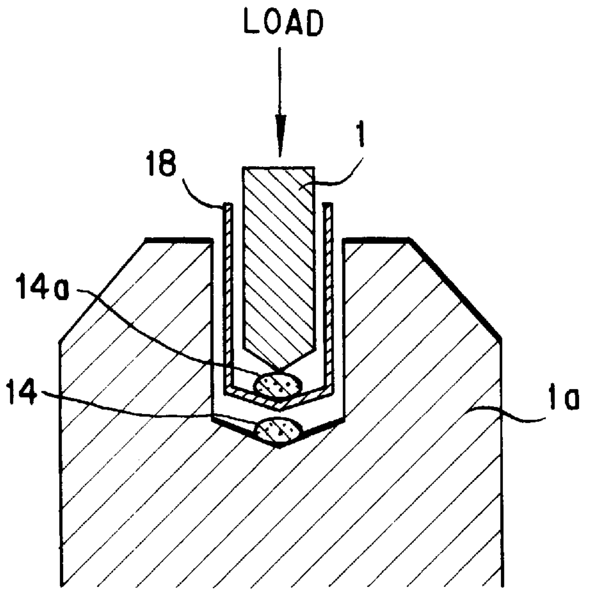
FIGS. 6A and 6B are sectional views of electrodes for plasma arc torches according to other embodiments of the present invention.
Figure 6B:
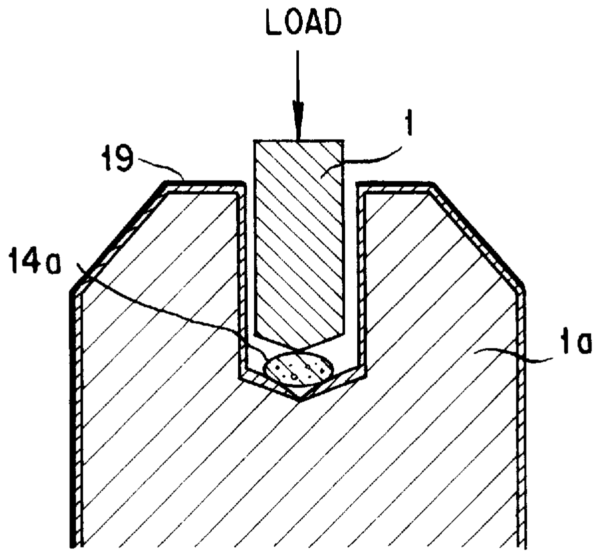

FIGS. 6A and 6B represent embodiments of the present invention other than those mentioned above.

In the embodiment shown in FIG. 6A, a cap 18 made of nickel prepared through deep drawing process so as to provide a thickness of 0.1 mm is mounted between the electrode member 1 and the copper electrode body 1*a*. This cap 18 and the electrode body 1*a* are brazed by a known brazing material 14 including copper (Cu) and the cap 18 and the electrode member 1 are brazed and joined by a brazing material 14*a* such as (Ag+3.9%Li) including no copper. In this case, there is no problem for the use of both the brazing materials 14 and 14*a* including no copper.

Furthermore, in this case, the nickel constituting the cap 18 has a melting point of 1455° C., which is far higher than those of the brazing materials 14 and 14*a,* so that a molten material of the copper can be blocked from invading from the outer side of the cap 18, i.e. from the electrode body side, into the electrode member 1.

Further, the joining between the cap 18 and the electrode member 1 with respect to the electrode body 1*a* is carried out, as shown in FIG. 6A, by putting therebetween the brazing materials 14 and 14*a* each in shape of mass and pushing them into the electrode body 1*a* while heating. The fused brazing materials 14 and 14*a* are spread over the entire joining surfaces, which are then firmly joined.

In the embodiment shown in FIG. 6B, a plating layer 19 formed of a material having a high melting point such as nickel or chromium is formed on the surface of the copper electrode body 1*a,* and the electrode member 1 is joined to the electrode body 1*a* through this plating layer 19 by using the brazing material 14*a,* such as (Ag+3.9%Li), including no copper.

In this embodiment, the plating layer 19 attains substantially the same function as that of the cap 18 of the embodiment shown in FIG. 6A and no copper mixed crystal layer is formed on the joining surface of the electrode member 1.

In the embodiments of FIGS. 6A and 6B, either one of hafnium, zirconium or titanium was used as a material for the electrode member 1, and when either one of these materials was used, any mixed crystal layer of the material constituting the electrode 1 and the other metal material was not formed to the joined surface of the electrode member 1.

Furthermore, in the foregoing embodiments, although silver was used as the material constituting the electrode body 1*a,* the silver was selected as substitute for the copper in view of cost merit and conductive property, and hence, silver alloy or other metal including no copper may be used other than the silver and silver alloy.

According to the present invention, the electrode member 1 composed of hafnium, zirconium, titanium or the like metal can be joined to the joining surface of the electrode body 1*a* without forming a mixed crystal layer, particularly, including copper on that surface.

Accordingly, since no brittle layer which is the mixed crystal layer is formed on the joining surface of the electrode, no crack occurs at the periphery of the electrode member 1 even in the repeated arc generation/extinction process, and the durability of the electrode can be remarkably improved.

Though the present invention has been described with reference to the exemplified embodiments, it will be apparent to those skilled in the art that various modifications, changes, deletions, additions and other variations can be made in the disclosed embodiments of the present invention without departing from the scope or spirit of the present invention. Accordingly, it should be understood that the present invention is not limited to the described embodiments and shall include the scope specified by the elements recited in claims and range of equivalent thereof.

We claim:

1. An electrode for a plasma arc torch in which an electrode member composed of either one of homologous elements of hafnium, zirconium or titanium, or a mixed material of these elements is embedded into a front end portion of an electrode body and brazed and joined thereto by a brazing material including no copper component.

2. An electrode for a plasma arc torch according to claim 1, wherein the front end portion of the electrode body to which the electrode member is joined is composed of a material including no copper component silver or silver alloy.

3. An electrode for a plasma arc torch according to claim 1, wherein an isolation member formed of a material having a high melting point and including no copper component nickel is joined to an electrode body including copper through the brazing material and the electrode body including copper, and the electrode member are joined through the isolation member which is joined to the electrode member through the brazing material.

4. An electrode for a plasma arc torch according to claim 3, wherein the isolation member is a cap.

5. An electrode for a plasma arc torch according to claim 3, wherein the isolation member is a plating layer.

6. An electrode for a plasma arc torch in which an electrode member comprising hafnium, zirconium or titanium is embedded into a front end portion of an electrode body and brazed and joined thereto by a brazing material that is free of copper.

7. The electrode for a plasma arc torch of claim 6, further comprising an isolation member formed of a material that has a high melting point and is free of copper, the isolation member being positioned between the electrode member and the electrode body and joined to the electode member and the electrode body by the brazing material.

* * * * *